Figure 4:
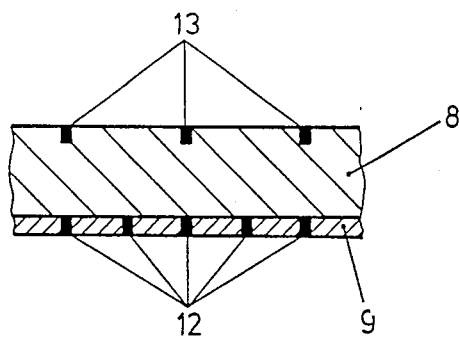

United States Patent [19]
Lass et al.

[11] Patent Number: 4,766,026
[45] Date of Patent: Aug. 23, 1988

[54] IDENTIFICATION CARD WITH A VISIBLE AUTHENTICITY FEATURE AND A METHOD OF MANUFACTURING SAID CARD

[75] Inventors: Joseph Lass; Hansjürgen Merkle, both of Munich; Wolfgang Becker, Neubiberg; Werner Herget; Erwin Lob, both of Munich, all of Fed. Rep. of Germany

[73] Assignee: GAO Gesellschaft für Automation und Organisation mbH, Munich, Fed. Rep. of Germany

[21] Appl. No.: 919,006

[22] Filed: Oct. 15, 1986

[30] Foreign Application Priority Data

Oct. 15, 1985 [DE] Fed. Rep. of Germany ....... 3536740

[51] Int. Cl.⁴ .............................................. B42D 15/02
[52] U.S. Cl. ..................................... 428/203; 428/212; 428/913; 283/74; 283/94; 283/904; 346/76 L; 346/135.1
[58] Field of Search ......................... 428/212, 913, 203; 283/75, 85, 86, 91, 94, 93, 109, 904, 74; 346/76 L, 135.1

[56] References Cited
U.S. PATENT DOCUMENTS 4,544,181 10/1985 Maurer et al. .................. 346/76 L
4,579,754 4/1986 Maurer et al. .
4,596,409 6/1986 Holbein et al. .................. 283/85 X

FOREIGN PATENT DOCUMENTS 2532935 2/1976 Fed. Rep. of Germany .
2817357 1/1979 Fed. Rep. of Germany .
2907004 8/1980 Fed. Rep. of Germany .
3151407 10/1983 Fed. Rep. of Germany .
3425263 1/1985 Fed. Rep. of Germany .
2044175 10/1980 United Kingdom .
1592390 7/1981 United Kingdom .
2111910 7/1983 United Kingdom .

*Primary Examiner*—Alexander S. Thomas
*Attorney, Agent, or Firm*—Bacon & Thomas

[57] ABSTRACT

Information is provided in a multilayer identification card by means of a laser beam. This information is recorded by irreversibly changing (blackening) transparent synthetic material. Synthetic materials which blacken at different intensity values are used for the individual card layers. By controlling the laser beam intensity, information can thus be recorded only in one layer or else simultaneously in several layers. If the layer arrangement, layer materials and recording parameters (intensity, writing width, etc.) are selected appropriately, images can be produced which change their appearance when the viewing angle is changed. The various visual effects which can thereby be otained serve to distinguish the authenticity of the identification card.

17 Claims, 3 Drawing Sheets

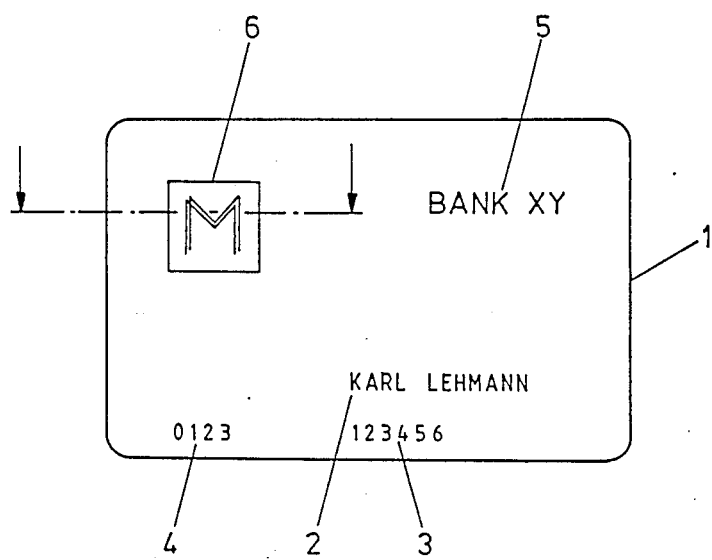
Fig. 1
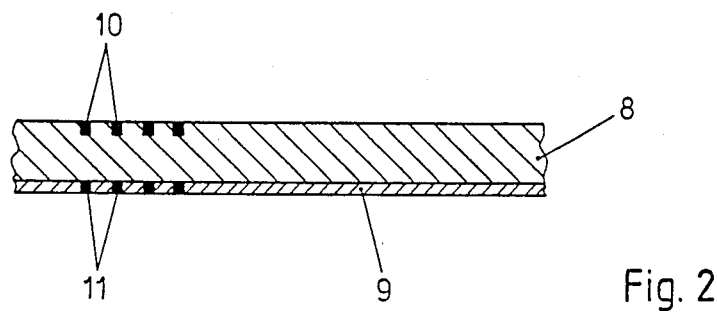
Fig. 2
　　
Fig 3a　　　　Fig. 3b

IDENTIFICATION CARD WITH A VISIBLE AUTHENTICITY FEATURE AND A METHOD OF MANUFACTURING SAID CARD

The present invention relates to an identification card containing a plurality of synthetic layers in which information is provided by means of a laser beam, said information being visible in the form of changes in the optical properties of the synthetic material due to irreversible changes in the material caused by the laser beam. Identification cards in the form of credit cards, bank cards, cash payment cards and the like are used increasingly in a great variety of service sectors, for example in cashless transfers and within enterprises. On the one hand, since they are so widespread they constitute typical mass-produced articles; their manufacture, i.e. the production of the card structure and the application of the card-individual user data, must be simple and inexpensive. On the other hand, the cards must be designed in such a way as to be protected to a maximum degree against forgery and falsification. The many types of identification cards already on the market or still in the development stage show the efforts exerted by the relevant industry to optimize the two above-mentioned contrary conditions.

German patent No. 29 07 004 discloses an identification card which fulfils the above-mentioned conditions. The method of manufacturing this known card is characterized in that the person-related data are inscribed in the finished, laminated card by means of a laser beam. The card comprises an opaque inlay enclosed between transparent cover layers. The writing process is performed through the transparent cover film. This considerably simplifies manufacture, on the one hand, since, for instance, no further production steps are required after personalization. On the other hand, it increases protection against forgery and falsification since, for example, the data are present in an unchangeable form due to the destruction of material caused by the laser beam. If the intensity of the laser beam is selected appropriately, writing on the inlay can at the same time produce a congruent marking in the cover film. The personal data are then present congruently in different card layers. This marking, for example in the form of a relief structure on the surface, can be easily tested manually. It thus also constitutes an authenticity feature, thereby making it much more difficult to manipulate the card or attempt to imitate such a card by a simulacrum counterfeit.

It has also been proposed (German patent No. 31 51 407) to provide as a recording medium in the card a synthetic layer which appears to a viewer to be completely transparent but absorbs the light of the laser beam to such an extent that blackening occurs in the film under the effect of the laser beam. Thus, pictures or data with high resolution or very good letter quality can be provided in layers which are transparent as such.

In spite of this high degree of protection against forgery and the relatively easy testability, there are still efforts to broaden the possibilities of designing the card with respect to its visual impression and to make it even more difficult to falsify or totally forge cards by introducing additional authenticity features which can only be imitated with great technical effort.

Thus, it has been proposed, for example, to increase the protection of synthetic cards against forgery by applying overlapping printed patterns to a plurality of individual transparent layers, creating a three-dimensional effect when the card is viewed due to the different positions of the printed patterns in the card structure (German "offenlegungsschrift" No. 25 32 935). The printed patterns are printed onto transparent films and the individual layers then joined together by applying heat and pressure. The printed patterns may consist of a great number of lines, so that a moire which changes depending on the viewing angle is visible due to the overlapping of the printed patterns.

The manufacture of such an identification card is elaborate since the printed patterns must be applied to various card layers in several printing processes and must be precisely placed. The card layers must then be joined together in such a way that the printed patterns register exactly one upon the other. When the card is laminated the layers soften and this may cause the printed patterns to be displaced or the printed pattern to be locally distorted. This results in high reject rates which are not acceptable for the economical manufacture of a massproduced article like an identification card.

The invention is based on the problem of retaining the technological and protective advantages of the laser writing method but broadening the possibilities of designing the identification card with respect to its visual impression, whereby the authenticity of the card should be visually testable in a simple manner.

This problem is solved by the features stated in the characterizing part of the main claim. Methods of manufacturing this identification card are the object of subclaims.

The invention is based on the fact that the appropriate selection of the card layer material and the laser or recording parameters makes it possible to provide pieces of information by means of a laser beam simultaneously in several layers or selectively only in individual layers, whereby these pieces of information may also be present separated from each other by a transparent intermediate area.

The information is provided in the card, for example, at a perpendicular angle of incidence. When the card is then viewed at this angle, the pieces of information overlap each other in the individual layers. If the card is tilted slightly, however, the pieces of information provided on the various planes of the card are visible singly and, if desired, also separately from each other.

Depending on the selection of the above-mentioned parameters, the information appears in a widened form or the pieces of information present in the individual layers are visible spatially separated from each other, so that double line writing is shown, for example.

It is known from German "offenlegungsschrift" No. 34 25 263 to provide information by means of a laser beam in a transparent data carrier at different layer depths, whereby the recording is determined at the various depths by controlling the focus position of the laser.

However, this method has considerable disadvantages and can be realized to manufacture identification cards having a standard thickness of 0.76 mm, if at all, only with great technical effort. It is technically difficult to reproduce defined control of the focus position of the laser within such a limited range. The data carrier must also meet the condition that it is completely flat since otherwise the position of the recording point is shifted in the card with respect to its depth during recording. Furthermore, it is not possible to write simultaneously in two different positions, for example, since this requires intermediate regulation of the focus position of the laser. The inventive method solves these problems by the special selection of the card layers and the card structure, making it possible by simply regulating the recording parameters, such as the radiant-flux density or intensity, to provide exactly overlapping writing on two or more different planes of the card at the same time.

Synthetic materials, like other materials, usually have the property that a change of material such as blackening, etc., is effected by a laser beam only when a certain intensity is exceeded. The necessary intensity value as of which the material is sensitive is determined, for instance, by the composition of the material. German patent No. 31 51 407 discloses, for example, a PVC film in which relatively low intensities suffice to cause blackening. Other materials are disclosed, for example, in German "offenlegungsschrift" No. 28 17 357, in which the necessary intensity values were lowered by admixing, for example, exothermically reactive substances. The term "necessary intensity value" refers in the following text to that intensity of the laser radiation at which changes such as blackening, etc., occur in the layer in question for the first time. The intensity value is thus defined as a property of the layer or layer material, in the sense of its sensitivity.

The inventive method makes it possible to provide visually testable features in a finished identification card with the aid of the above-mentioned facts, said features conveying a different visual and, if desired, three-dimensional impression at different viewing angles. This feature is referred to in the following as the parallax image.

In an exemplary embodiment of the invention, a two-layer structure is selected for the card, the layers being made of a transparent synthetic material and having different absorptive behavior with respect to the laser beam. The layer facing the laser is, for example, a PVC film which remains unchanged up to certain radiant-flux densities and shows a visible change only at relatively high radiant-flux densities. However, for the layer located under this layer, regarded from the laser, a synthetic material is selected which shows a change even at relatively low intensities. If information is provided with a low intensity in the card having this structure, a visible change, for example blackening, occurs only in the more sensitive layer. At high intensities, blackening occurs not only in this layer but also in the less sensitive layer, where it can be limited to the surface area of the layer by appropriately selecting the recording parameters. Thus, congruent information is present at two different layer depths. A transparent space unaffected by the laser beam may form between these two information planes, so that the latter are also spatially separated from each other.

This way of providing information by means of a laser beam allows for a great number of different possibilities of designing the card which give the card a characteristic appearance. A linear symbol provided congruently on two different planes appears, for example, in a widened form or even in double writing when viewed from the side. Characters provided in this way thus change their appearance in accordance with the viewing angle, whereby the visible depth of the writing further reinforces the impression of a three-dimensional image. The overall thickness of the two layers is preferably selected in such a way that the writing width with which the information is recorded is only about half the overall thickness of the layers, which approximately corresponds to the depth to which the information mation extends in the card. The smaller the ratio of the writing width to the overall thickness of the films is, the more striking the change in the appearance of the information is when the viewing angle is varied.

In a further exemplary embodiment of the invention, the card structure already described above is also selected. A line screen is provided in this card, the intensity being varied selectively when the line screen is provided. By changing the intensity the line screen is interrupted in the layer facing the laser with higher necessary intensity values and the recesses thus formed may have the shape, for example, of a symbol, pattern or logo. The more sensitive film, however, shows the complete line screen. When viewed at right angles, only the line screen is thus recognizable as such. When viewed from the side, however, these two line screens are mutually displaced for the viewer, so that the recesses in the upper layer become visible and thus a symbol provided in this way is clearly recognizable for the viewer. The lines of the screen may be set so close together that, when viewed from the side, the screen lines on the upper and lower layer planes complement each other to form a solid black surface. In the areas where the line screen is interrupted in a layer, the symbols formed by the recesses are then visible as light areas on a dark background. Instead of a straight line pattern, these lines may also be wavy. In the case of such a line pattern the viewer sees the lines of the individual line screens at locally varying intervals, giving rise to a moire that varies in accordance with the viewing angle.

The parallax image may have a different information content from card to card due to appropriate control of the laser beam, the change of the information content being obtainable virtually without any additional effort if a computer-controlled laser is used. Providing individual card data in this parallax image makes the latter cardspecific as an authenticity feature, i.e. it is bound to a specific card and can therefore not be transferred to other cards. This individualization therefore makes a major contribution to improving the protection of the card against forgery. The parallax image is preferably recorded at the moment when the conventional personalization is carried out so that all data are linked together reliably and correctly. This prevents, in a simple manner, the card-individual data of the parallax image from being erroneously linked with the personalization data of a different card of the production series.

Figure 5A:
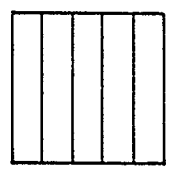
Figure 6:
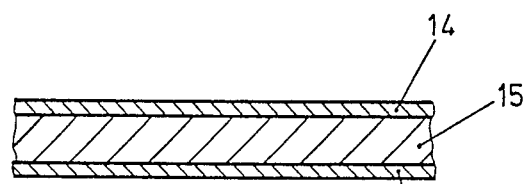
Figure 7:
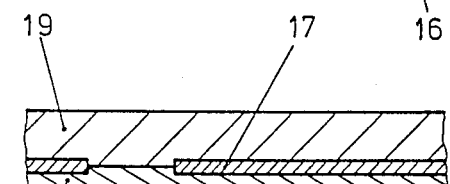
Figure 8:
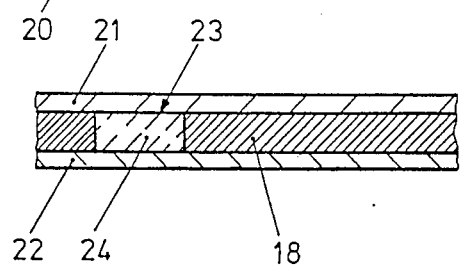
Figure 9:
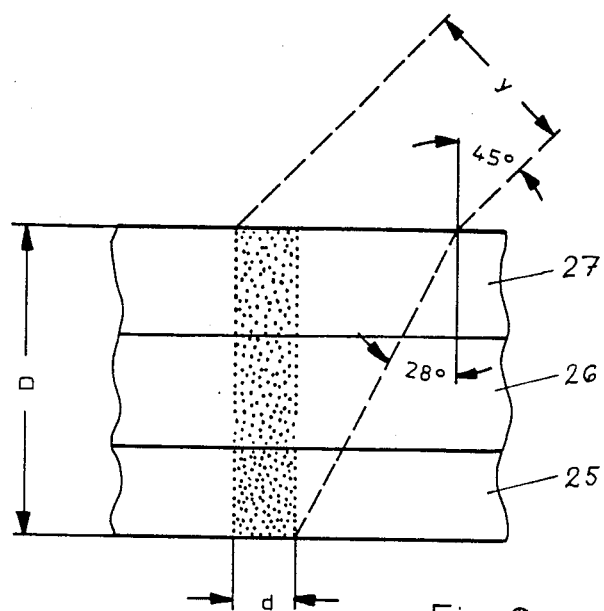
Figure 10:
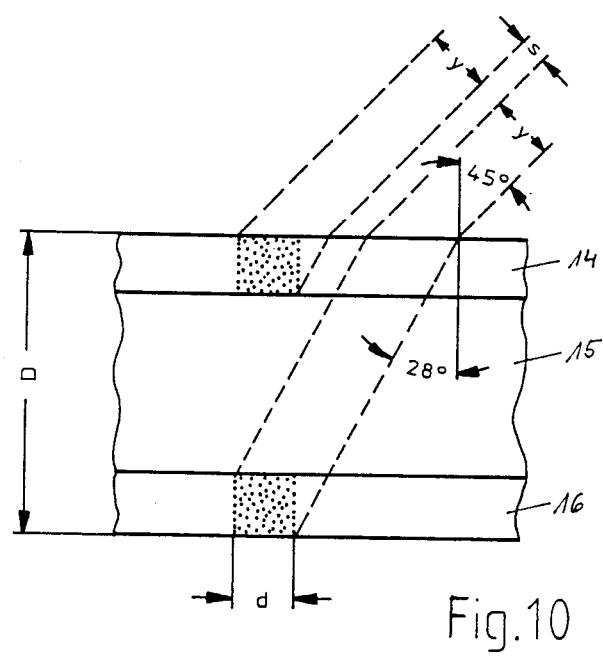

These are only examples for the great number of possibilities of design provided by the inventive method. Further advantages and advantageous embodiments of the invention are the object of the following description with reference to the figures, in which FIG. 1 shows an inventive identification card from the front, FIG. 2 is a cross-sectional view, FIGS. 3a and b are views of the parallax image from different viewing angles, FIG. 4 shows a further possibility of designing the inventive card, FIGS. 5a and b are views of the various appearances thereof, FIGS. 6 to 8 show various layer structures of the card, FIG. 9 shows a further possibility of designing the inventive card, and FIG. 10 is an enlarged view of an embodiment of the card shown in FIG. 6.

FIG. 1 shows an identification card 1 from the front, which is provided with the usual data. The card-individual data, such as name of the user 2, account number 3 and card number 4, are preferably provided in an inside card layer by means of a laser beam, while the user-independent data, such as the institution, are generally provided on one of the card layers by printing techniques. In one area 6 of the card, the inventive parallax image is provided in an exemplary embodiment.

FIG. 2 shows a cross-sectional view of the card according to FIG. 1, indicating the position of the information on the various planes of the card. The card shown here comprises two layers 8 and 9, which are transparent at least in area 6. Layer 8 consists of a synthetic film which shows blackening only at accordingly high radiant-flux densities, whereby this blackening can be limited to the surface area, as explained below. The blackening generally involves the simultaneous formation of a microrelief. For the latter layer, a synthetic film is used, for example, which is available under the trade name "Stauffen 44.4", which is a hard PVC film having a density of 1.32 g/cm$^3$ (without pigment) and a softening temperature of 65°–66° C. and in which, after exposure to a pulsed ND-YAG laser with an intensity of $3 \times 10^8$ W/cm$^2$ in the focus, a visible change occurs in the form of blackening and small blisters. Second layer 9 is a synthetic film which is already blackened at low intensities. Thus it is possible to write on this film without writing on upper cover layer 8 at the same time. For the sensitive film, a synthetic film is used, for example, which is sold under the trade name "Alkor-Plast CCO-013", which is a hard PVC film which has a linear absorption coefficient K and a thickness of 0.094 mm which at a wavelength of 1064 nm is approx. 15 times greater than a hard PVC film conventionally used in laminating technology. In these films the necessary intensity value is about 30% lower than in the former film (maintaining the laser and writing parameters). The information is provided in transparent area 6 of the card by means of a laser which in this case is directed at right angles to the card, whereby layer 8, i.e. the film with the higher necessary intensity value, is the layer facing the laser. When writing is performed with an intensity high enough for both films, pieces of information 10, 11 are thus provided on two different layer planes of the card, exactly congruent to each other. The writing width, which substantially corresponds to the focus diameter of the laser in the area of these layers, is selected in such a way as to be considerably smaller, preferably at least by a factor of two, than the overall thickness of both films. An image provided in both films therefore has a different appearance in accordance with the viewing angle since the images in the individual layers are seen overlapping at one viewing angle and singly at another. The two pieces of information are separated from each other by a transparent intermediate area formed by the non-blackened area in layer 8. The recording parameters and the thickness of this layer may be selected in such a way that this intermediate area is as large as possible.

If, for example, writing is performed in pulsed operation and the pulse frequency and the scanning speed are selected in such a way that the laser pulses overlap spatially, the changes in the material are concentrated in the vicinity of the surface of layer 8 facing the laser.

It is also possible to separate the information by a transparent space, as explained below in more detail with reference to FIG. 6, by a three-layer construction, providing a film permeable to the laser beam or responsive only at very high intensities between two films sensitive to the laser beam.

A symbol provided in this way has the appearance shown in FIG. 3a when viewed at right angles or at the angle at which the information is provided. At a viewing angle deviating from the recording angle, the appearance changes (FIG. 3b). The symbol is split and is visible in the form of double lines. In this way the account number, for example, or else standard information such as a logo, emblem, etc., can be provided. Card-individual data, such as the account number, or other data, such as the period of validity, may also be worked into a logo, so that all cards have a logo having the same appearance but containing card-individualizing or time-limiting information in certain areas. The cards can thus be equipped with a uniform logo which, however, is bound to the specific card, for example by having card-individual information worked in.

Figure 5B:
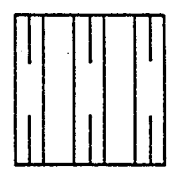

FIG. 4 shows a further possibility of designing the card. A uniform screen drawing consisting, for example, several straight or wavy lines 12 disposed beside each other, is provided in more sensitive layer 9. When this line pattern is provided, the intensity is selectively changed so that only part of line screen 13 is present in the upper cover layer. Thus, information can be provided in the upper layer by selectively interrupting the line screen, said information not being recognizable when the card is viewed at right angles (FIG. 5a) but appearing when the card is viewed from the side (FIG. 5b), since the deeper line screen is then no longer congruent with the screen thereabove. The number of lines and the distance therebetween can be selected in such a way that the line screens complement each other on the various layer planes when viewed from the side, making a solid blackened area visible and the recesses in the upper information layer recognizable in the form of light areas on a dark background. Characters provided in this way are very easy to recognize visually and allow for simple authenticity testing of the card.

FIG. 6 shows a further possible layer structure of the card. This card consists of three transparent layers 14, 15 and 16, whereby intermediate layer 15 is a layer permeable to the laser beam or responsive only at a very high intensity, while layers 14 and 16 have absorptive behavior corresponding to the above example. This layer structure is especially well suited for simultaneously or selectively writing on the outer card layers while maintaining a transparent space.

FIG. 10 shows an enlarged view of the state of affairs when viewed at an angle of 45°. Outer layers 14 and 16 have a thickness of 100μ, while a thickness of 300μ is selected for layer 15. Pieces of information 10, 11 are provided in layers 14 and 16. Pieces of information 28, 29, which are provided with a writing width d, can be recognized when viewed at 45° with an apparent writing width y and are separated from each other by a transparent space s.

In order to obtain a clear separation of the two images, the sum D of the film thicknesses is preferably selected in such a way, maintaining the ratio 1:3:1 of the individual film thicknesses, that the recognizable transparent space s corresponds approximately to half the actual writing width. At a refractive index of the films of 1.5, the ratio of writing width d to overall layer thickness D which is necessary for this purpose is 1:5.

Laser writing also makes it possible, however, to provide the information easily not only with a perpendicular beam but also at an oblique angle of incidence to the card surface. Thus writing can be provided which is recognizable, for example, as double line writing when the card is viewed "normally", but then turns into simple writing when the card is rotated accordingly.

It is not necessary for all card layers to be transparent synthetic layers. FIGS. 7 and 8 show, for example, suitable embodiments in which opaque layers made of a different material or the same material are worked into the card structure. The card shown in FIG. 7 shows, for example, a card structure with a thin paper layer 17, as is preferably used in identification cards, embedded between transparent card layers 19 and 20. This paper layer is, for example, a security paper known from security paper production, having authenticity marks such as watermarks, security threads and a security print located on the surface of the paper. A window is provided in this paper layer. This window is provided, for example, by being punched out of the paper layer before the card layers are laminated. During lamination the card layers are joined together by applying heat and pressure, the space located in the paper layer being filled in by the adjacent synthetic layers, which soften during lamination. The inventive parallax image is then provided in this window by the above-mentioned method. When the parallax image is being provided it can be dimensioned so as to partly protrude beyond this window. Outside this window the laser causes blackening in this paper layer. This overlapping of the inventive parallax image with the laser writing on the paper layer involves the great advantage that this parallax image is thus directly connected with the security paper. The transfer of a parallax image containing, for example, only standard information, from a genuine card to false cards can thus be prevented in a simple way. Identification cards are generally provided with a background pattern which varies aperiodically from card to card. If the parallax image overlaps with this background pattern it is thus not possible to punch the parallax image out of a genuine card and transfer it to another card, since the background patterns are present in a matching form only in the most exceptional cases.

FIG. 8 shows a further embodiment of a possible layer structure, whereby card core layer 18 may in this case be a relatively thick opaque core layer in which a window is provided. The window in the opaque core is relatively large here so that a transparent material permeable to a laser beam is preferably incorporated into this window, so that this layer has a constant thickness. This material provided in the window can, for example, also be a slightly colored layer so that further possibilities of designing the card also result in this respect. This core layer is overlaid on both sides by transparent films 21, 22, these transparent films each being films which can be changed by a laser as of certain intensities, so that laser writing is possible simultaneously in both card layers or else selectively in individual layers.

To give the effects brought about according to the invention a clearly recognizable design, it is not absolutely necessary for the so-called parallax image to be provided in a completely transparent card area. The inlay shown in FIG. 7 may also be opaque across its entire surface. In this case, both transparent films to be written on must of course be arranged on one side of the opaque inlay. To protect the inlay the latter is then preferably covered by a second protective layer on the side opposite the above-mentioned films.

A further embodiment is shown in FIG. 9. The card has a three layer structure with layers 25, 26 and 27, a synthetic material being selected for middle layer 26 in which the intensity values for causing a change are between those of adjacent films 25 and 27 (FIG. 9). At an intensity higher than the necessary intensity values of all three films, information 28 provided by a laser at right angles extends through all three layers. A piece of information provided with writing width d is recognizable only as a narrow line pattern with width d at a perpendicular viewing angle, with an appropriate overall thickness D of the layers, while it is visible in a widened form at an angle of 45°. The extent of widening is determined by the thickness of the layers, the writing width and the refractive indices of the materials. In order to obtain a conspicuous effect, these parameters are selected in such a way that the apparent writing width y is at least doubled when viewed at 45°. At a refractive index of 1.5 the ratio of the writing width to the overall thickness of the films must therefore be selected so as to be smaller than 0.3. In the preferred embodiment shown in FIG. 9, the ratio of d/D is 0.2. By appropriately selecting the intensity, the writing can also be limited locally to layer 25 with the lowest threshold, or to layers 25 and 26.

In this way it is possible to make the characteristic property of laser writing, i.e. writing within the volume, clearly recognizable visually, whereby the visible depth of the writing makes it appear clearly three-dimensional.

We claim:

1. An identification card containing a plurality of synthetic layers in which information is provided by means of a laser beam, said information being visible in the form of changes in the optical properties of the synthetic material due to irreversible changes in the material caused by the laser beam, characterized in that
   at least a first and a second layer have transparent areas which overlap,
   the first layer and the second layer have the property of changing visibly when exposed to the laser beam, this change being caused only as of certain intensity values and the particular intensity value required herefor being lower for the first layer than for the second layer,
   a first piece of information is provided in the first layer,
   a second piece of information is provided in the second layer, which is identical or is part of the first piece of information and is provided simultaneously with the first piece of information so that the second peice of information is present substantially congruent to the first piece of information in the recording direction, and in that the information in the first and second layers is provided by the beam in such a way as to be visible, either overlapping or singly, depending on the viewing angle, its appearance varying in accordance with the viewing angle.

2. The identification card according to claim 1, characterized in that the writing width (d) with which the information is recorded is smaller than the sum (D) of the layer thicknesses of the first and second layers, plus the thickness of further layers, if any, embedded between these layers, the writing width (d) preferably being smaller than the sum (D) by a factor of two.

3. The identification card according to claim 1, characterized in that the second layer with the higher necessary radiant-flux density threshold is located on the card surface.

4. The identification card according to claim 1, characterized in that the information in the second layer is provided in the vicinity of the surface of this layer which is opposite the first layer and is thus spatially separated from the first piece of information by a transparent space.

5. The identification card according to claim 4 characterized in that the first and second pieces of information are spatially separated from each other, and in that the pieces of information are linear letters, numbers or symbols which are visible in the form of double line writing at one viewing angle while they are only visible in an overlapping form at a different viewing angle.

6. The identification card according to claim 1, characterized in that at least the first and the second layers are transparent films integrated over their entire surface into the card.

7. The identification card according to claim 1, characterized in that at least a transparent third layer is located between the first and the second layers, whose necessary intensity value for causing a change is higher than that in the first layer.

8. The identification card according to claim 7, characterized in that the necessary intensity value of the third layer is higher than that of the first layer, but lower than that of the second layer and contains a third piece of information which is at least part of the first piece of information.

9. The identification card according to claim 8, characterized in that the first, second and third pieces of information are dots, letters, numbers, symbols or patterns which have either a simple or an approximately double writing width depending on the viewing angle.

10. The identification card according to claim 7, characterized in that the necessary intensity value of the third layer is higher than that of the first and second layers.

11. The identification card according to claim 10, characterized in that the first and second pieces of information are spatially separated from each other by the unchanged transparent third layer.

12. The identification card according to claim 1 characterized in that the identification card has one or more layers which are opaque at least in one area, and in that the first and second pieces of information are visible simultaneously from at least one side of the card.

13. The identification card according to claim 12 characterized in that the pieces of information run smoothly into the adjacent opaque layer.

14. The identification card according to claim 1 characterized in that the second piece of information is a genuine part of the first piece of information, and in that the difference between the first and second pieces of information is visible at at least one viewing angle.

15. The identification card according to claim 1, characterized in that the identification card has an additional opaque layer which has a window and the information is provided in this window area.

16. The identification card according to claim 1, characterized in that these pieces of information contain card-individual data.

17. The identification card according to claim 1, characterized in that the information is a logo or an emblem.

* * * * *